US012692097B2

(12) United States Patent
Kim

(10) Patent No.: US 12,692,097 B2
(45) Date of Patent: Jul. 28, 2026

(54) APPARATUS OF MTL AND TRANSFER SYSTEM INCLUDING THE SAME

(71) Applicant: SEMES CO., LTD., Cheonan-si (KR)

(72) Inventor: Do Hyun Kim, Cheonan-si (KR)

(73) Assignee: Semes Co., Ltd., Cheonan-si (KR)

( * ) Notice: Subject to any disclaimer, the term of this patent is extended or adjusted under 35 U.S.C. 154(b) by 283 days.

(21) Appl. No.: 18/334,056

(22) Filed: Jun. 13, 2023

(65) Prior Publication Data

US 2024/0051767 A1 Feb. 15, 2024

(30) Foreign Application Priority Data

Aug. 9, 2022 (KR) ......................... 10-2022-0099082

(51) Int. Cl.
B65G 47/61 (2006.01)
B65G 41/00 (2006.01)

(52) U.S. Cl.
CPC ........... B65G 47/61 (2013.01); B65G 41/003 (2013.01); B65G 41/007 (2013.01); B65G 2201/0297 (2013.01)

(58) Field of Classification Search
USPC ................................... 198/463.3; 104/130.04
See application file for complete search history.

(56) References Cited

U.S. PATENT DOCUMENTS

| | | | | |
|---|---|---|---|---|
| 2,743,028 A | * | 4/1956 | Reich ...................... | B65G 47/61 |
| | | | | 212/203 |
| 3,880,299 A | * | 4/1975 | Zollinger ............. | B65G 1/0414 |
| | | | | 414/273 |
| 4,252,217 A | * | 2/1981 | Benjamin ................. | B66F 9/24 |
| | | | | 414/592 |

FOREIGN PATENT DOCUMENTS

| | | |
|---|---|---|
| KR | 2013-0016529 A | 2/2013 |
| KR | 10-20140053439 A | 5/2014 |
| KR | 10-2018-0002219 A | 1/2018 |
| KR | 10-2020-0130757 A | 11/2020 |
| KR | 102290659 B1 | 8/2021 |

OTHER PUBLICATIONS

Korean Office Action issued Sep. 30, 2025 in Korean Patent Application No. 10-2022-0099082.
Korean Office Action dated Mar. 11, 2026 issued in Korean Patent Application No. 10-2022-0099082.

* cited by examiner

*Primary Examiner* — William R Harp

(74) *Attorney, Agent, or Firm* — Harness, Dickey & Pierce, P.L.C.

(57) ABSTRACT

A maintenance lift (MTL) apparatus includes an auxiliary track in contact with a travel rail forming a movement path of a transfer apparatus to extend a movement path of the travel rail and supporting the transfer apparatus put into the travel rail or introduced from the travel rail, a lift part adjusting its length in a vertical direction or moved to move the auxiliary track so that the auxiliary track is disposed at a first position where the auxiliary track is adjacent to a floor surface as compared with the travel rail and the transfer apparatus is introduced or carried out to the outside or is disposed at a second position where the auxiliary track is in contact with the travel rail.

14 Claims, 7 Drawing Sheets

[FIG. 1]
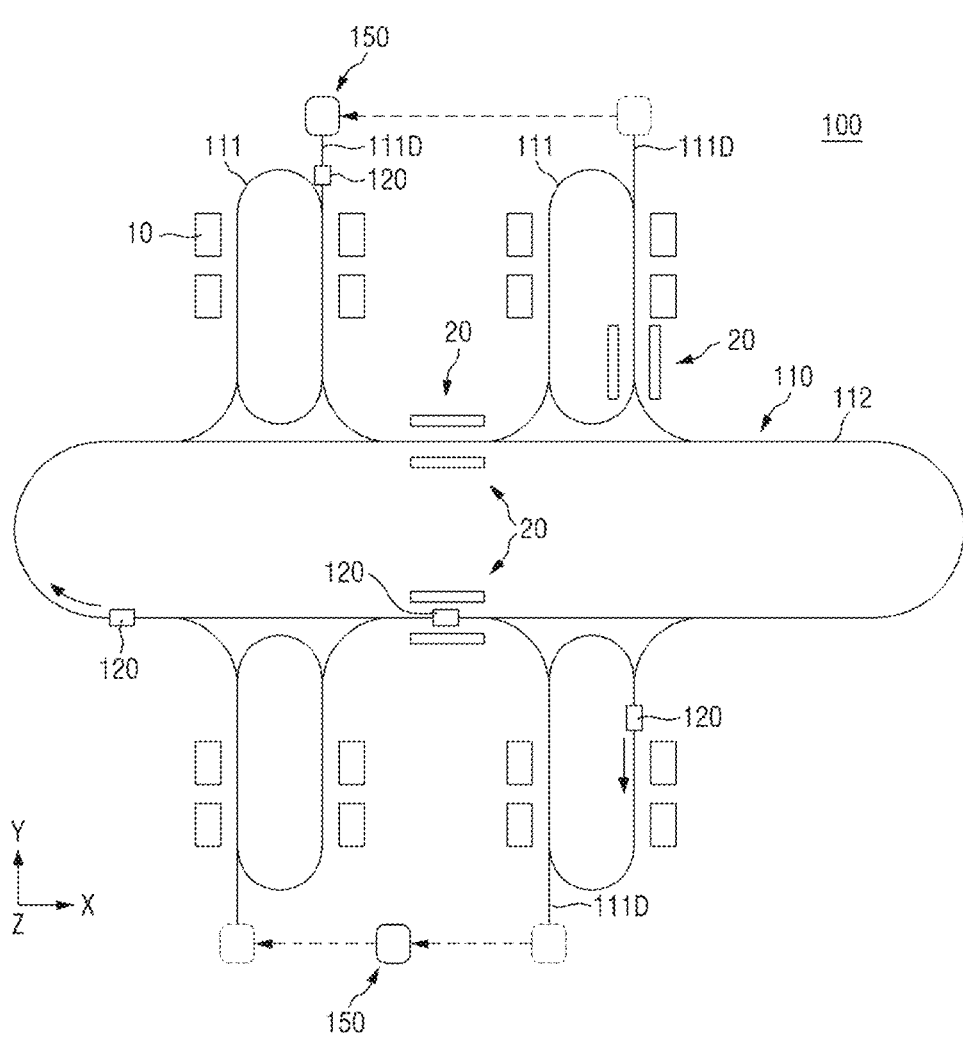

[FIG. 2]
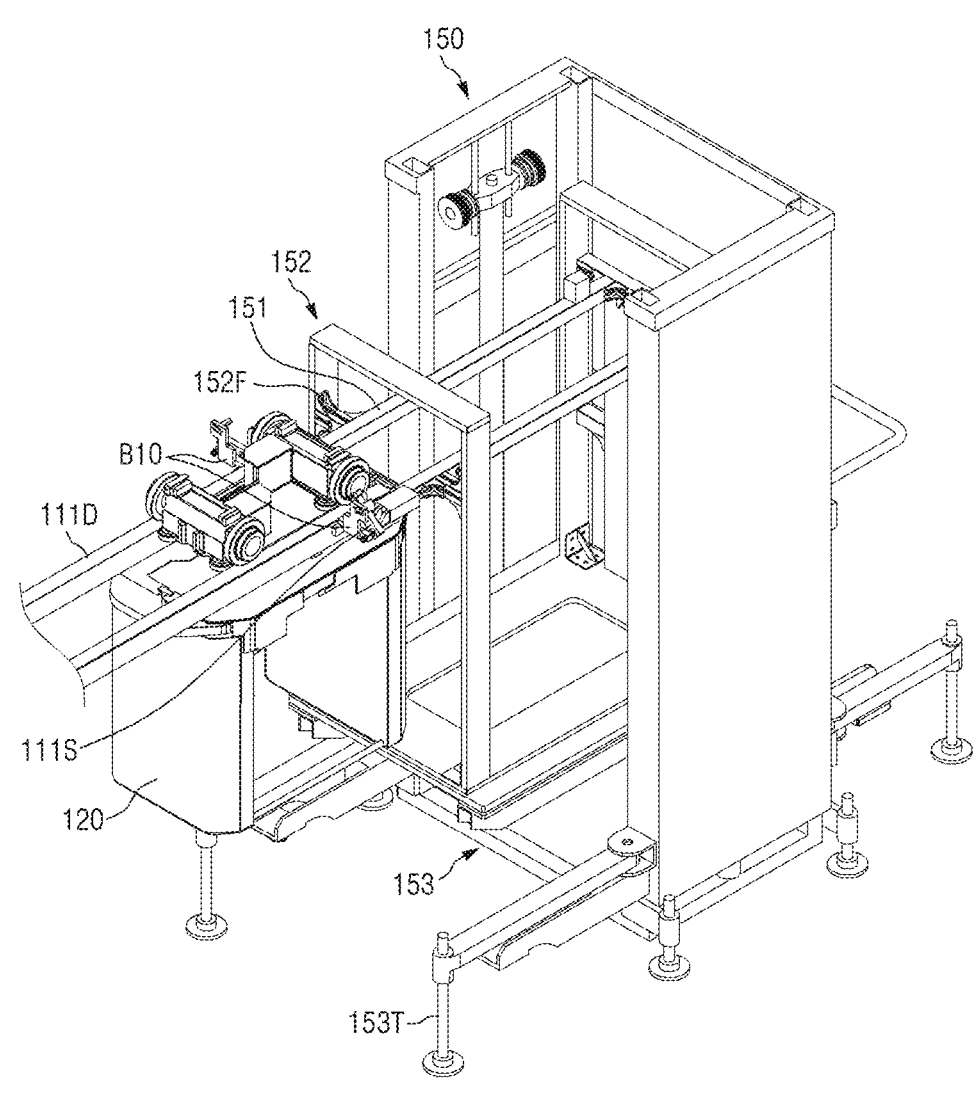

[FIG. 3]
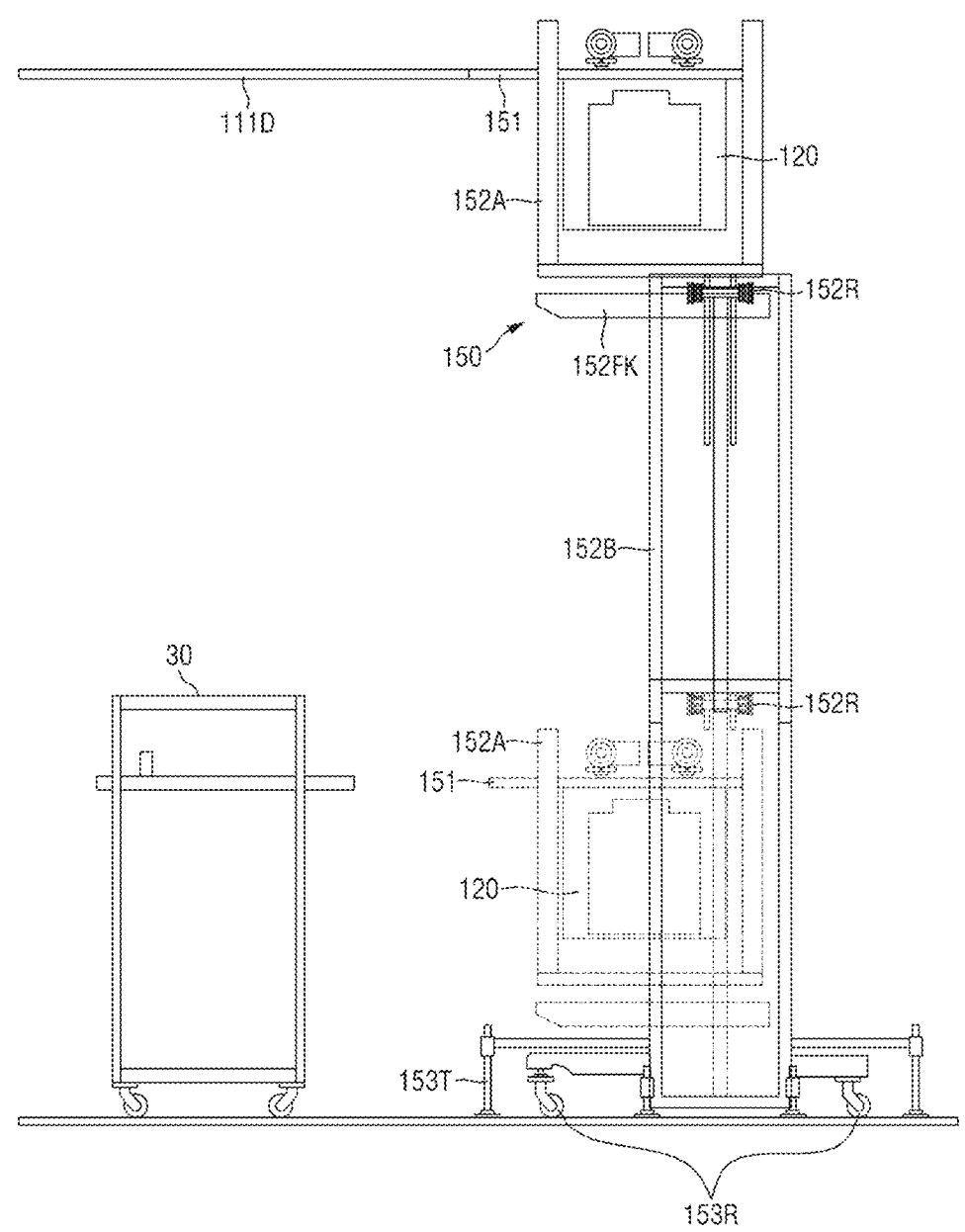

[FIG. 4]
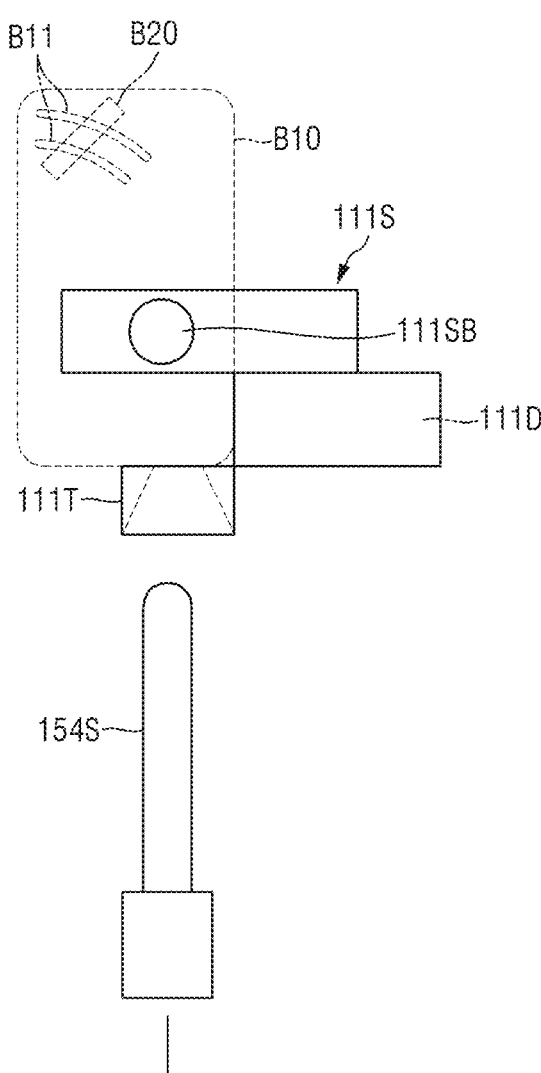

[FIG. 5]
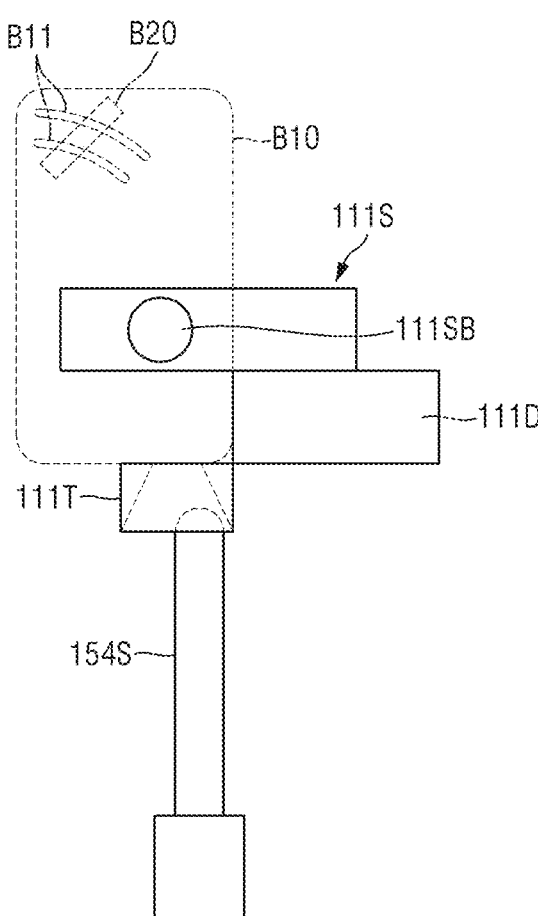

[FIG. 6]
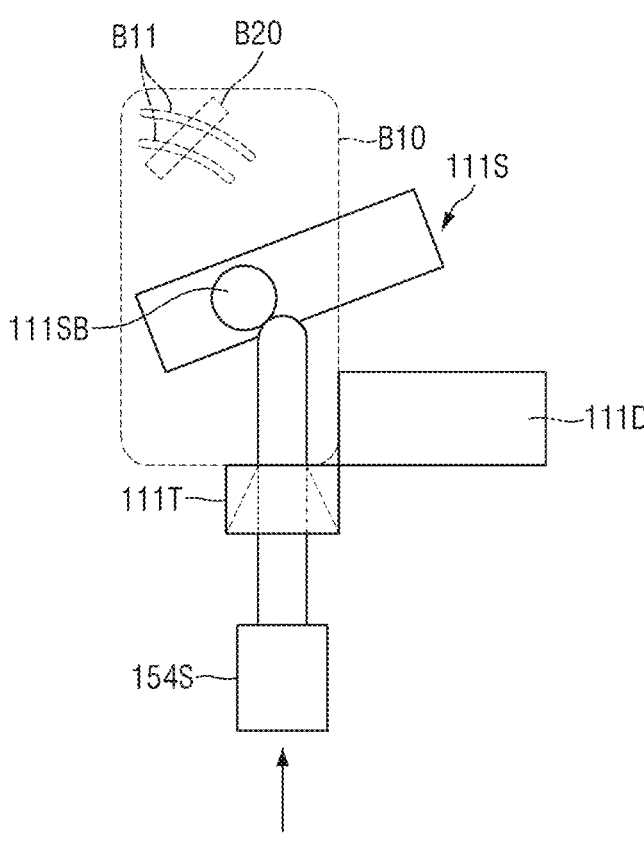

[FIG. 7]
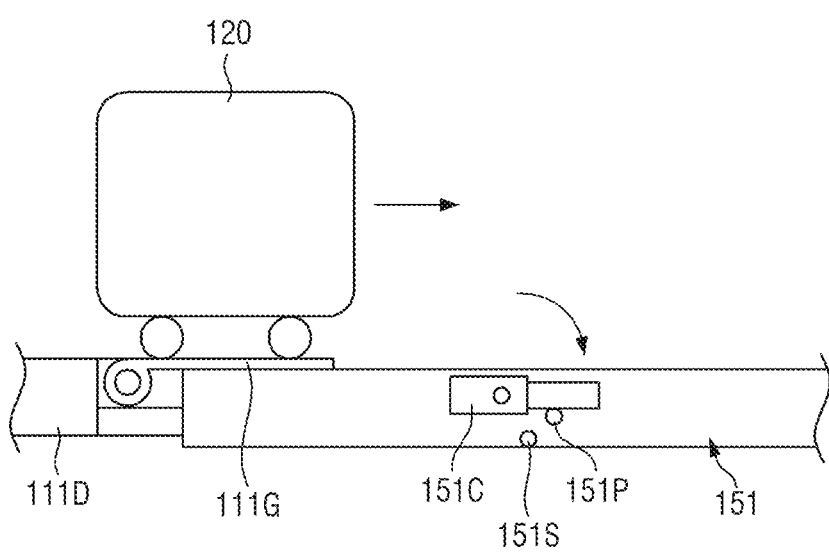
[FIG. 8]
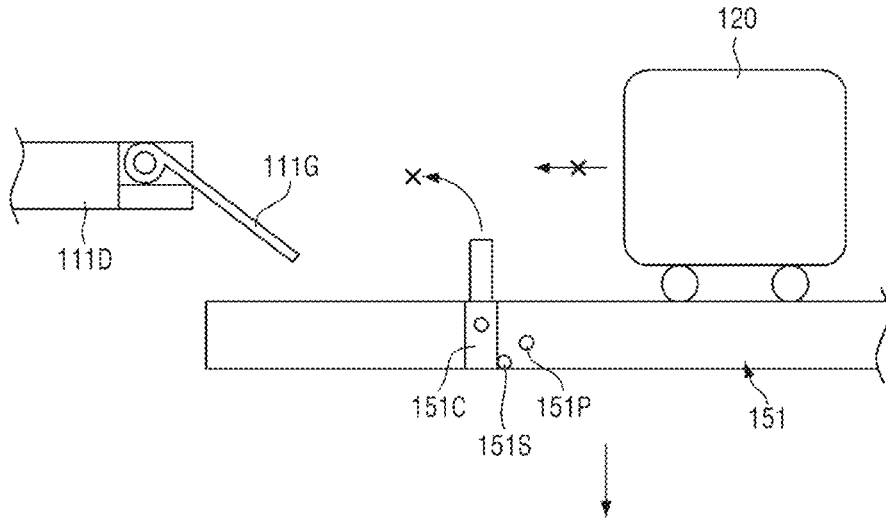

APPARATUS OF MTL AND TRANSFER SYSTEM INCLUDING THE SAME

CROSS-REFERENCE TO RELATED APPLICATION

This application claims priority from Korean Patent Application No. 10-2022-0099082 filed on Aug. 9, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a maintenance lift (MTL) apparatus and a transfer system including the same.

2. Description of the Related Art

Semiconductor manufacturing processes are processes for manufacturing semiconductor elements on a substrate (wafer), and include, for example, exposing, depositing, etching, ion implanting, cleaning, packaging, and the like. In a manufacturing plant for manufacturing the semiconductor elements, one or more floors are configured as clean rooms, and a plurality of semiconductor manufacturing facilities for performing the semiconductor manufacturing processes may be disposed on each floor.

Finally processed substrates may be completed by repeatedly performing a plurality of manufacturing processes on substrates (wafers) in the semiconductor manufacturing facilities, and when a manufacturing process is completed in a specific semiconductor manufacturing facility, the substrates may be transferred to a semiconductor manufacturing facility for the next manufacturing process. Here, the substrates may be transferred in a state in which they are stored in a front opening unified pod (FOUP) capable of accommodating a plurality of substrates. The FOUP accommodating the substrates may be transferred by a transfer apparatus (overhead hoist transport (OHT)). That is, tens to hundreds of semiconductor manufacturing facilities are provided in one place, and a plurality of transfer apparatuses (overhead hoist transports (OHTs)) are provided in order to move between the semiconductor manufacturing facilities.

SUMMARY

Meanwhile, a travel rail may be configured to have a great length, such that it takes several minutes or longer when a transfer apparatus moving along the travel rail moves to both ends of the travel rail. However, when a maintenance lift (hereinafter referred to as an 'MTL') for carrying out the transfer apparatus is provided in a form in which it is fixed to the travel rail, since a working space is wide and the travel rail is long, work paths of other transfer apparatuses that are normally operating are hindered in a process of moving the transfer apparatus to a position of the MTL when carrying out the transfer apparatus, such that operation efficiency may decrease. In addition, when MTLs are installed at various places to shorten a moving length of the transfer apparatus, efficiency of a work space may decrease and cost may increase. Accordingly, improvement is required.

Aspects of the present disclosure provide a maintenance lift (MTL) apparatus capable of improving line efficiency by carrying-out of a transfer apparatus (e.g., task performance (substrate transfer work) of the transfer apparatus) and operating a facility at low cost.

Aspects of the present disclosure also provide a transfer system capable of improving line efficiency by carrying-out of a transfer apparatus and operating a facility at low cost.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an MTL apparatus includes an auxiliary track in contact with a travel rail forming a movement path of a transfer apparatus to extend a movement path of the travel rail, a lift part adjusting its length in a vertical direction or elevated or lowered to move the auxiliary track so that the auxiliary track is disposed at a first position where the auxiliary track is adjacent to a floor surface as compared with a position of the travel rail or is disposed at a second position where the auxiliary track is in contact with the travel rail, and a body part provided with the lift part and including wheels so as to move on the floor surface, wherein the auxiliary track is elevated to the second position, and the transfer apparatus moves between the travel rail of a position to which the body part is moved and the auxiliary track.

According to another aspect of the present disclosure, a transfer system includes a travel rail forming a movement path of a transfer apparatus, and an MTL apparatus in contact with or spaced apart from the travel rail, wherein the MTL apparatus includes an auxiliary track extending a movement path of the travel rail, a lift part adjusting its length in a vertical direction or elevated or lowered to move the auxiliary track so that the auxiliary track is disposed at a first position where the auxiliary track is adjacent to a floor surface as compared with a position of the travel rail or is disposed at a second position where the auxiliary track is in contact with the travel rail, and a body part provided with the lift part and including wheels so as to move on the floor surface, and the auxiliary track is elevated to the second position, and the transfer apparatus moves between the travel rail of a position to which the body part is moved and the auxiliary track.

Detailed contents of other exemplary embodiments are described in a detailed description and are illustrated in the drawings.

In an MTL apparatus and a transfer system including the same according to the present disclosure, a transfer apparatus (overhead hoist transport (OHT)) may be carried out from a bay part in which it is performing a task without needing to move to a fixed MTL positioned at a long distance. Accordingly, an operation of a transfer apparatus that is normally operating does not need to be stopped, such that work delays of other transfer apparatuses due to a carrying-out work of the transfer apparatus may be reduced, and thus, line efficiency (task efficiency of the transfer apparatus) may be improved.

In addition, in the present disclosure, line efficiency may be increased by moving the MTL apparatus rather than by increasing the number of MTL apparatuses, and thus, the number of MTL apparatuses does not need to be excessively increased, such that facilities may be operated at low cost.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a plan view illustrating a transfer system in which a maintenance lift (MTL) apparatus according to some exemplary embodiments of the present disclosure is provided;

FIG. 2 is a perspective view illustrating the MTL apparatus according to some exemplary embodiments of the present disclosure;

FIG. 3 is a side view illustrating the MTL apparatus according to some exemplary embodiments of the present disclosure;

FIG. 4 is a view illustrating a form in which a link part of the MTL apparatus according to some exemplary embodiments of the present disclosure moves in a downward direction of a travel rail;

FIG. 5 is a view illustrating a form in which the link part of the MTL apparatus according to some exemplary embodiments of the present disclosure is inserted into a guide block;

FIG. 6 is a view illustrating a form in which the link part of the MTL apparatus according to some exemplary embodiments of the present disclosure rotates a first stopper;

FIG. 7 is a view illustrating a form in which an auxiliary track and a travel rail of a transfer system according to some exemplary embodiments of the present disclosure face each other; and FIG. 8 is a view illustrating a form in which the auxiliary track of the transfer system according to some exemplary embodiments of the present disclosure moves in a downward direction.

DETAILED DESCRIPTION OF THE EMBODIMENTS

Hereinafter, exemplary embodiments of the present disclosure will be described in detail with reference to the accompanying drawings. Advantages and features of the present disclosure and methods for accomplishing these advantages and features will become apparent from exemplary embodiments to be described later in detail with reference to the accompanying drawings. However, the present disclosure is not limited to exemplary embodiments to be disclosed below, but may be implemented in various different forms, these exemplary embodiments will be provided only in order to make the present disclosure complete and allow one of ordinary skill in the art to which the present disclosure pertains to completely recognize the scope of the present disclosure, and the present disclosure will be defined by the scope of the claims. Throughout the specification, the same components will be denoted by the same reference numerals.

The terms 'first', 'second', and the like are used to describe various elements, components, and/or sections, but these elements, components, and/or sections are not limited by these terms. These terms are used only in order to distinguish one element, component, or section from another element, component or section. Accordingly, a first element, a first component, or a first section to be mentioned below may also be a second element, a second component, or a second section within the technical spirit of the present disclosure.

The terms as used herein are for describing exemplary embodiments rather than limiting the present disclosure. In the present specification, a singular form includes a plural form unless stated otherwise in the phrase. The terms "comprise" and/or "comprising" as used herein do not exclude the existence or addition of one or more other components, steps, operations, and/or elements in addition to the mentioned components, steps, operations, and/or elements.

FIG. 1 is a plan view illustrating a transfer system in which a maintenance lift (MTL) apparatus according to some exemplary embodiments of the present disclosure is provided, and FIGS. 2 and 3 are views for describing the MTL apparatus according to some exemplary embodiments of the present disclosure. In addition, FIGS. 4 to 6 are views for describing a link part and a guide block of the MTL apparatus according to some exemplary embodiments of the present disclosure. In addition, FIG. 7 is a view illustrating a form in which an auxiliary track and a travel rail of a transfer system according to some exemplary embodiments of the present disclosure face each other, and FIG. 8 is a view illustrating a form in which the auxiliary track of the transfer system according to some exemplary embodiments of the present disclosure moves in a downward direction.

Referring to FIGS. 1 to 8, a transfer system 100 according to an exemplary embodiment of the present disclosure may include a travel rail 110, transfer apparatuses 120, and MTL apparatuses 150.

In the transfer system 100, the transfer apparatus 120 may move along the travel rail 110 to perform a task. Here, the task may refer to transferring an article such as a wafer from an arbitrary position to a target position in a semiconductor manufacturing process. For example, the transfer apparatus 120 may transfer a front opening unified pod (FOUP) in which a wafer is accommodated to provide the water from a load port of any one semiconductor manufacturing facility 10 to a load port of another manufacturing facility 10.

However, article storage parts 20 for loading and storing articles may be provided around the travel rail 110, and depending on the semiconductor manufacturing process, arbitrary positions or target positions may be the article storage parts 20. In addition, the article storage parts 20 may be provided in an open track 111D to be described later according to exemplary embodiments.

In addition, the transfer apparatus 120 according to the present exemplary embodiment may be put into the travel rail 110 using the MTL apparatus 150, but may use a fixed MTL (not illustrated). Hereinafter, an example in which the transfer apparatus 120 is carried out from the travel rail 110 using the MTL apparatus 150 according to the present exemplary embodiment will be described.

Specifically, the travel rail 110 may provide a movement path along which the transfer apparatus 120 moves in order to perform the task. The travel rail 110 may be installed on the ceiling and may have a structure in which straight lines and curved lines are combined with each other.

The travel rail 110 according to the present exemplary embodiment may include bay parts 111, a passage part 112, and open tracks 111D.

The bay part 111 may be a section in which the task of the transfer apparatus 120 is performed, and a plurality of bay parts 111 may be provided for utilization of a work space and easy management of the transfer apparatuses 120 and may be connected to each other by the passage part 112.

For example, the bay part 111 may have a closed loop structure. However, the closed curve structure has a branching/merging structure, such that the plurality of bay parts 111 may be connected to the passage part 112. Referring to FIG. 1, it has been illustrated in the present exemplary embodiment that two bay parts 111 are provided above the passage part 112 and two bay parts 111 are provided below the passage part 112. However, this have been illustrated for the purpose of understanding and convenience, and the number of bay parts 111 may be various. For example, 20 to 30 bay parts 111 may be provided above the passage part 112 and 20 to 30 bay parts 111 may be provided below the passage part 112.

The passage part 112 may connect the plurality of bay parts 111 to each other. That is, the transfer apparatus 120 is not limited to moving only in one bay part 111, and may have a structure in which it moves along the passage part 112 to move to the bay parts 111 adjacent to each other.

The open track 111D may form an open section so that an auxiliary track 151 of the MTL apparatus 150 is in contact with the open track 111D to extend. This is for the transfer apparatus 120 to move between the travel rail 110 and the auxiliary track 151 so that the transfer apparatus 120 is carried out from the open track 111D to the MTL apparatus 150. In other words, the open track 111D may be provided as an open-type track for connecting the auxiliary track 151 of the MTL apparatus 150 and the travel rail 110 to each other as one track.

The open track 111D may be provided in a structure in which it branches to one or more bay parts 111. As an example, the open tracks 111D may be provided in all of the bay parts 111 so that the transfer apparatuses 120 are carried into or out from the respective bay parts 111.

Accordingly, the transfer apparatus 120 may be carried out by moving only in a section from each bay part 111 in which it is being performing the task to the open track 111D without needing to move to a long distance, for example, without needing to pass through both ends of the travel rail 110 or the plurality of bay parts 111.

When a moving distance of the transfer apparatus 120 is decreased, a section interfering with a movement path of the transfer apparatus 120 that is normally operating may be decreased. Accordingly, the task of the transfer apparatus 120 that is normally operating may not be hindered. In addition, even though the transfer apparatus 120 that is not automatically operated due to a failure is manually carried out, the transfer apparatus 120 moves in a short section, and thus, work efficiency may be improved.

In addition, it has been illustrated that the open track 111D according to the present exemplary embodiment branches from the bay part 111 in an outward direction, but this is only an example and the present disclosure is not limited thereto. As another example, the open track 111D may have a structure in which it branches toward the inside of a closed curve of the bay part 111. In addition, the open track 111D is not limited to being provided in the bay part 111, and various modified examples such as an example in which the open track 111D is provided in the passage part 112 are possible.

The open track 111D is not in a state in which the MTL apparatus 150 is always connected to the open track 111D, and the MTL apparatus 150 may be connected to the open track 111D when the transfer apparatus 120 needs to be carried out. Accordingly, the open track 111D has an open structure in which the MTL apparatus 150 is not connected to the open track 111D in normal times, such that the transfer apparatus 120 needs to be prevented from falling from the open track 111D due to deviation from a path. That is, a problem that the transfer apparatus 120 moves to and falls from the open track 111D due to a situation such as a malfunction of the transfer apparatus 120 needs to be prevented.

To this end, the open track 111D may be provided with a first stopper 111S. The first stopper 111S may be hinge-coupled to the open track 111D and rotated as an example.

The first stopper 111S may block the movement of the transfer apparatus 120 by traversing a movement path of the transfer apparatus 120 or allow the movement of the transfer apparatus 120 by opening the movement path of the transfer apparatus 120, according to its rotation state.

In order to connect the first stopper 111S to the open track 111D, bases B10 mediating the open track 111D and the first stopper 111S and having a plate shape may be provided. In addition, separation preventing members B20 may be provided in the bases B10 so that a rotation angle of the first stopper 111S is limited.

However, an assembly error or a design error may occur in the separation preventing member B20. Since it is necessary that the separation preventing member B20 does not limit a movement range of the first stopper 111S to an angle smaller than a set range, the separation preventing member B20 may be provided in a movable structure so as to include an error range. To this end, the base B10 may have a structure in which one or more long holes B11 are formed (two holes are illustrated in FIG. 4) and the separation preventing member B20 slides along the long holes B11.

The first stopper 111S may include a cam follower bearing 111SB for a rotation structure.

The cam follower bearing 111SB may be pushed at a position where a link part 154S is eccentric from the center of the cam follower bearing 111SB. Accordingly, the cam follower bearing 111SB may have a structure in which the first stopper 111S may be rotated rather than a structure in which the cam follower bearing 111SB moves in an upward direction on the basis of the central axis. An operation of the first stopper 111S will be described later with reference to FIGS. 4 to 6.

The transfer apparatus 120 may move along the travel rail 110. For example, the transfer apparatus 120 may be provided as an overhead hoist transport (OHT) in order to efficiently transfer an article.

The transfer apparatus 120 may perform the task while moving along the travel rail 110. The task may refer to transferring an article in the semiconductor manufacturing process, as described above.

Meanwhile, the transfer apparatus 120 needs to be carried out from the travel rail 110 when the transfer apparatus 120 fails. The carrying-out of the transfer apparatus 120 from the travel rail 110 may be performed by the MTL apparatus 150.

The MTL apparatus 150 is a maintenance lift apparatus, and may be provided to put the transfer apparatus 120 into the travel rail 110 or carry out the transfer apparatus 120 from the travel rail 110. However, an example in which the transfer apparatus 120 is carried out will hereinafter be described.

The MTL apparatus 150 may include an auxiliary track 151, a lift part 152, a body part 153, and a link part 154S.

Briefly, the MTL apparatus 150 is movable rather than a fixed structure, and may be moved to any one of the plurality of bay parts 111 and connected to the open track 111D. The MTL apparatus 150 provided to be movable may have a structure in which the body part 153 moves to a plurality of points of the travel rail 110 and the transfer apparatus 120 moves between the travel rail 110 of a position to which the body part 153 is moved and the auxiliary track 151.

Specifically, the auxiliary track 151 may be in contact with the travel rail 110 to extend the movement path of the travel rail 110. The transfer apparatus 120 introduced from the travel rail 110 may move along the auxiliary track 151, and the auxiliary track 151 may support the transfer apparatus 120.

In other words, the auxiliary track 151 is a track provided in the MTL apparatus 150, and may form one track with the travel rail 110. The auxiliary track 151 may be in contact with the open track 111D so that the transfer apparatus 120 may move between the MTL apparatus 150 and the travel rail 110. The auxiliary track 151 may have the same or similar width and size as the open track 111D.

The auxiliary track 151 may move between a first position and a second position by an operation of the lift part 152. As an example, the first position is a position where the auxiliary track 151 is adjacent to a floor surface as compared with the travel rail 110, and may be a position for carrying out the transfer apparatus 120 to the outside. The second position may be a position where the auxiliary track 151 is in contact with the travel rail 110.

That is, the auxiliary track 151 may move between the floor surface and a position where the auxiliary track 151 is in contact with the open track 111D by the operation of the lift part 152. When the auxiliary track 151 is disposed at the first position after the transfer apparatus 120 is introduced at the second position, the transfer apparatus 120 may be put into a bogie 30 at the first position and carried.

In addition, the auxiliary track 151 may be provided with a separation preventing part 151C and a second stopper 151S for preventing the transfer apparatus 120 from falling, which will be described later with reference to FIGS. 7 and 8.

In addition, the auxiliary track 151 may be connected to the lift part 152 so as to be elevated or lowered by the operation of the lift part 152. As an example, the auxiliary track 151 may have a structure in which an end of the auxiliary track 151 adjacent to the open track 111D is connected to the lift part 152 so that a sag due to a load of the transfer apparatus 120 does not occur (see 152F in FIG. 2). In other words, the auxiliary track 151 may be connected to the lift part 152 so as to stably support the transfer apparatus 120 while being able to be elevated or lowered by the lift part 152.

The lift part 152 is a component elevating or lowering the auxiliary track 151, and may adjust its length in a vertical direction or may be elevated or lowered. The lift part 152 may include, for example, a frame 152A and elevating or lowering members 152B and 152R so that the auxiliary track 151 is disposed at the first position or the second position.

The auxiliary track 151 may be installed at an upper portion of the frame 152A. The frame 152A may have a structure in which a plurality of bars or rods are coupled to each other so that a load of the frame 152A is minimized. As an example, the frame 152A may have a rectangular frame structure.

The elevating or lowering members 152B and 152R may be installed on the body part 153 and adjust a height of the frame 152A. As an example, the elevating or lowering members 152B and 152R may include a cylinder module 152B and a guide roller 152R.

The cylinder module 152B may include a fork 152FK on which the frame 152A is supported. In addition, the cylinder module 152B may be provided as an actuator (a hydraulic jack or a pneumatic jack) that uses hydraulic pressure or pneumatic pressure so that a length thereof in the vertical direction is adjusted. An operating mechanism of the hydraulic jack and the pneumatic jack is the known technology, and a detailed description thereof will thus be omitted. However, the present disclosure is not limited thereto, and other examples will be described later.

The guide roller 152R may guide the movement of the frame 152A, and may be guided to the body part 153 or may be omitted according to exemplary embodiments.

The body part 153 may be installed with the lift part 152, and may have a frame structure in which the frame 152A and the cylinder module 152B may be installed. Various modified examples of the body part 153 such as an modified example of an exemplary embodiment in which the body part 153 has a box structure in which plates are provided on circumferential surfaces thereof are possible.

The body part 153 may be provided with wheels 153R to so as be movable. The body part 153 may be manually moved by a worker. However, the body part 153 is not limited thereto, and may also be moved by electric power by including a motor, a battery, a controller, and the like, according to a modified example of an exemplary embodiment.

The body part 153 may be provided with an overturn preventing part 153T. The overturn preventing part 153T is an outrigger, and may rotate in an outward direction on the basis of the body part 153 to expand a support area of the body part 153. In addition, the overturn preventing part 153T may adjust its length in the vertical direction to be in contact with the floor surface or be spaced apart from the floor surface.

This is to prevent friction from occurring on the floor surface when the overturn preventing part 153T rotates so that the overturn preventing part 153T becomes distant from an outer circumference of the body part 153, and subsequently bring the overturn preventing part 153T into contact with the floor surface to fix the overturn preventing part 153T. In addition, when the MTL apparatus 150 is moved, the overturn preventing part 153T may be spaced apart from the floor surface again so that friction by the overturn preventing part 153T does not occur, and the overturn preventing part 153T may be rotated to become close to side surfaces of the body part 153 so as not to be caught by a worker or a work space.

The overturn preventing part 153T may be hinge-coupled to the body part 153 in order to rotate, and a screw thread may be formed in order to adjust a height of the overturn preventing part 153T, but various modified examples are possible.

The link part 154S may be installed on the auxiliary track 151 and rotate the first stopper 111S. This is to dispose the first stopper 111S at a position that interferes with the movement path of the travel rail 110 or a position that does not interfere with the movement path of the travel rail 110, in other words, to prevent or allow the movement of the transfer apparatus 120.

The link part 154S may push a lower portion of the first stopper 111S in an upward direction in association with the elevation of the auxiliary track 151 so as to rotate the first stopper 111S. As an example, the link part 154S may include a pin (not illustrated) extending in the upward direction. The pin of the link part 154S may be guided to a through hole of a guide block 111T, and may be inserted into the through hole of the guide block 111T, such that the link part 154S may be linked to the guide block 111T. That is, the link part 154S may be fitted into or separated from the guide block 111T in association with the elevating or the lowering of the auxiliary track 151 without a separate manipulation.

Hereinafter, operations of the first stopper 111S and the link part 154 will be described with reference to FIGS. 4 to 6.

Referring to FIG. 4, first, the guide block 111T may be provided below the first stopper 111S.

The guide block 111T may be installed on a side portion of the travel rail 110 (may be installed via the base B10), and may have a through hole (no reference numeral) formed to penetrate therethrough in the vertical direction and having a diameter decreasing toward the upward direction. An upper diameter of the through hole may be the same as a diameter of the pin (no reference numeral) of the link part 154S, and a lower diameter of the through hole may be greater than the diameter of the pin (no reference numeral) of the link part 154S.

By such a tapered through hole, it is sufficient if the pin of the link part 154S is fitted into the through hole in a state in it is disposed below the through hole having a greater diameter than the pin without needing to be linked to the guide block 111T in a state in which it is positioned on the same central axis as the central axis of the through hole, and thus, fine adjustment for coincidence between the central axes is not required. In a process of inserting the link part 154S into the through hole of the guide block 111T, the link part 154S may be guided along a taper of the through hole (see FIG. 5).

In addition, the central axis of the through hole of the guide block 111T may be eccentric from the central axis of the cam follower bearing 111SB. This is to provide the link part 154S at a position where the link part 154S may push a side surface of the cam follower bearing 111SB in a process in which the link part 154S is elevated.

Referring to FIG. 5, the link part 154S may not coincide with the central axis of the through hole of the guide block 111T in a process in which the link part 154S is inserted into the guide block 111T. On the other hand, referring to FIG. 6, the link part 154S may coincide with the central axis of the through hole of the guide block 111T while penetrating through an upper portion of the through hole of the guide block 111T.

Accordingly, the link part 154S pushes the side surface of the cam follower bearing 111SB at a position eccentric from the central axis of the cam follower bearing 111SB. Accordingly, the first stopper 1115 may rotate. The first stopper 111S is provided at a position in contact with the travel rail 110 to interfere with the travel rail 110 when the link part 154S is spaced apart from the first stopper 111S (see FIGS. 4 and 5). In this case, the movement of the transfer apparatus 120 is limited by the first stopper 111S.

On the other hand, the first stopper 111S rotates when the cam follower bearing 111SB is pushed by the link part 154S (see FIG. 6). In this case, the first stopper 111S is not in contact with the travel rail 110 and is spaced apart from the travel rail 110, such that the travel rail 110 does not interfere with the movement path and is opened.

Hereinafter, the separation preventing part 151C, the second stopper 151S, and a rotating plate 111G will be described with reference to the drawings.

Referring to FIGS. 7 and 8 (in which the transfer apparatus 120 is illustrated for convenience of explanation and a ratio may be different), first, the separation preventing part 151C may be provided in the auxiliary track 151. The separation preventing part 151C may interfere with a path of the transfer apparatus 120 or allow the movement of the transfer apparatus 120 according to its rotation.

The separation preventing part 151C rotates and lies down in a second direction (a clockwise direction in FIG. 7) opposite to a first direction (a counterclockwise direction in FIG. 7) (see FIG. 7) or stands so as to interfere with the path of the transfer apparatus 120, and the rotation of the separation preventing part 151C in the first direction in a state in which the separation preventing part 151C stands may be limited by the second stopper 151S (see FIG. 8).

The second stopper 151S may be provided on a side surface of the separation preventing part 151C in the auxiliary track 151. The second stopper 151S may limit a rotation angle of the separation preventing part 151C in the first direction. As an example, the second stopper 151S may be provided as a projection, a pin, or the like, protruding to block the separation preventing part 151C.

In addition, a rotation angle of the separation preventing part 151C in the first direction may be limited according to exemplary embodiments. For example, a protrusion part 151P may be provided at a position spaced apart from the second stopper 151S in the auxiliary track 151. It is sufficient if the protrusion part 151P is provided to be in contact with a lower portion of a position where the separation preventing part 151C lies down in a horizontal direction and is provided at a position preventing the separation preventing part 151C from rotating in the first direction and standing in an opposite direction in a state in which the separation preventing part 151C lies down in the horizontal direction.

The separation preventing part 151C and the second stopper 151S as described above may allow the transfer apparatus 120 to move from the travel rail 110 toward the auxiliary track 151, but may prevent the transfer apparatus 120 from moving the auxiliary track 151 toward the travel rail 110. This is to prevent the transfer apparatus 120 from being arbitrarily operated and falling from the auxiliary track 151 in a process in which the auxiliary track 151 supporting the carried-out transfer apparatus 120 is lowered from the second position to the first position.

In other words, the transfer apparatus 120 may be put into the travel rail 110 using the fixed MTL, and may be immediately carried out using the movable MTL apparatus 150 according to the present exemplary embodiment so as not to interfere with the transfer apparatus 120 that is normally operating when it is carried out. In this case, the separation preventing part 151C is provided in the auxiliary track 151 so as to prevent the transfer apparatus 120 carried out to the MTL apparatus 150 from falling.

In addition, the travel rail 110 may be provided with the rotating plate 111G.

The rotating plate 111G may be provided at a position that the auxiliary track 151 faces in the travel rail 110. The rotating plate 111G may have a shape of a plate that is axially rotated. The rotating plate 111G may smoothly form the movement path of the transfer apparatus 120 by connecting the open track 111D of the travel rail 110 and an upper surface of the auxiliary track 151 to each other.

For example, the rotating plate 111G may be installed at an end of the open track 111D. The rotating plate 111G may be in contact with the auxiliary track 151 according to the elevating or the lowering of the auxiliary track 151 to axially rotate.

Referring to FIG. 7, when the auxiliary track 151 is disposed at the second position, which is a height of the open track 111D, the rotating plate 111G may be in contact with the upper surface of the auxiliary track 151. In addition, according to an exemplary embodiment, even though a height of the auxiliary track 151 is lower than a height of the open track 111D, and accordingly, a step is formed between the auxiliary track 151 and the open track 111D, the rotating plate 111G may smoothly connect the auxiliary track 151 and the open track 111D to each other.

Referring to FIG. 8, when the auxiliary track 151 is lowered, the rotating plate 111G is not supported by the auxiliary track 151 and thus, may rotate in a downward direction. However, a jaw (no reference numeral) is formed on a lower portion of the rotating plate 111G, such that a rotation angle of the rotating plate 111G may be limited. This is to allow the rotating plate 110G to rotate in the upward direction again by the auxiliary track 151 by preventing the rotating plate 111G from being bent at 90°.

In addition, as described above, in the lift part 152 according to the present exemplary embodiment, the elevating or lowering members 152B and 152R are not limited to the cylinder module 152B. As another example, the lift part 152 may be provided with a gear module (not illustrated), which may include a rack gear connected to the frame 152A, a pinion gear engaged with the rack gear, and a motor transferring a torque to a pinion gear.

Alternatively, the elevating or lowering members may include a wire winding module. The wire winding module may include a wire and a winch winding the wire. That is, the wire winding module may have a structure in which it adjusts a height of the frame 152A according to a winding degree of the wire.

Alternatively, the elevating or lowering members may be provided with a chain and a sprocket and may implement elevating or lowering of the frame 152A by operations of the chain and the sprocket. That is, various modified examples of the elevating or lowering members are possible.

In the transfer system 100 according to the exemplary embodiment as described above, the transfer apparatus 120 may be carried out from the bay part 111 in which it is performing the task without needing to move to the fixed MTL positioned at a long distance. Accordingly, an operation of the transfer apparatus 120 that is normally operating does not need to be stopped, such that work delays of other transfer apparatuses 120 due to a carrying-out work of the transfer apparatus 120 may be reduced, and thus, line efficiency (task efficiency of the transfer apparatus) may be improved.

The exemplary embodiments of the present disclosure have been described hereinabove with reference to the accompanying drawings, but it will be understood by one of ordinary skill in the art to which the present disclosure pertains that various modifications and alterations may be made without departing from the technical spirit or essential feature of the present disclosure. Therefore, it is to be understood that the exemplary embodiments described above are illustrative rather than being restrictive in all aspects.

What is claimed is:

1. A maintenance lift (MTL) apparatus comprising:
an auxiliary track in contact with a travel rail forming a movement path of a transfer apparatus to extend a movement path of the travel rail;
a lift part configured to adjust a length of the lift part in a vertical direction or elevated or lowered to move the auxiliary track such that the auxiliary track is disposed at a first position where the auxiliary track is adjacent to a floor surface as compared with a position of the travel rail or is disposed at a second position where the auxiliary track is in contact with the travel rail; and
a body part provided with the lift part, the body part including wheels to move on the floor surface,
wherein the auxiliary track is configured to be elevated to the second position, and the transfer apparatus is configured to move between the travel rail of a position to which the body part is moved and the auxiliary track, and
wherein the lift part includes:
a frame on which the auxiliary track is installed; and elevating or lowering members provided on the body part that include a cylinder adjusting a height of the frame.

2. The MTL apparatus of claim 1, wherein the cylinder includes a fork on which the frame is supported, the cylinder being configured to elevate or lower the fork using hydraulic pressure or pneumatic pressure so that a length thereof in the vertical direction is adjusted.

3. A maintenance lift (MTL) apparatus comprising:
an auxiliary track in contact with a travel rail forming a movement path of a transfer apparatus to extend a movement path of the travel rail;
a lift part configured to adjust a length of the lift part in a vertical direction or elevated or lowered to move the auxiliary track such that the auxiliary track is disposed at a first position where the auxiliary track is adjacent to a floor surface as compared with a position of the travel rail or is disposed at a second position where the auxiliary track is in contact with the travel rail; and
a body part provided with the lift part, the body part including wheels to move on the floor surface,
wherein the auxiliary track is configured to be elevated to the second position, and the transfer apparatus is configured to move between the travel rail of a position to which the body part is moved and the auxiliary track, and further comprising:
a guide block installed on the travel rail, the guide block having a through hole formed to penetrate therethrough in the vertical direction and having a diameter decreasing toward an upward direction; and
a link installed on the auxiliary track and including a pin guided to the through hole to penetrate through the guide block.

4. The MTL apparatus of claim 3, further comprising:
a first stopper above the guide block, the first stopper being rotatably installed on the travel rail so as to interfere with the movement path by traversing the travel rail or open the movement path,
wherein the link is configured to push a lower portion of the first stopper in the upward direction in association with the elevation of the auxiliary track so as to rotate the first stopper.

5. The MTL apparatus of claim 4, further comprising:
a separation preventing part provided in the auxiliary track, the separation preventing part being configured to interfere with a path of the transfer apparatus or allowing movement of the transfer apparatus according to a rotation of the preventing part; and
a second stopper on a side surface of the separation preventing part in the auxiliary track, the second stopper being configured to limit a rotation angle of the separation preventing part in a first direction,
wherein the separation preventing part is configured to rotate and lie down in a second direction opposite to the first direction or stand so as to interfere with the path of the transfer apparatus, a rotation of the separation preventing part in the first direction in a state in which the separation preventing part stands being limited by the second stopper.

6. A maintenance lift (MTL) apparatus comprising:
an auxiliary track in contact with a travel rail forming a movement path of a transfer apparatus to extend a movement path of the travel rail;
a lift part configured to adjust a length of the lift part in a vertical direction or elevated or lowered to move the auxiliary track such that the auxiliary track is disposed at a first position where the auxiliary track is adjacent to a floor surface as compared with a position of the travel rail or is disposed at a second position where the auxiliary track being in contact with the travel rail;

a body part provided with the lift part, the body part including wheels to move on the floor surface, the auxiliary track being configured to be elevated to the second position, and the transfer apparatus is configured to move between the travel rail of a position to which the body part is moved and the auxiliary track; and an overturn preventing part provided in the body part, the overturn preventing part being configured to rotate in an outward direction on the basis of the body part to expand a support area of the body part, the overturn preventing part being configured to adjust a length of the overturn preventing part in the vertical direction to be in contact with the floor surface or be spaced apart from the floor surface.

7. A transfer system comprising:

a travel rail forming a movement path of a transfer apparatus; and an MTL apparatus in contact with or spaced apart from the travel rail, wherein the MTL apparatus includes:

an auxiliary track configured to extend a movement path of the travel rail;

a lift part configured to adjust a length of the lift part in a vertical direction or elevated or lowered to move the auxiliary track so that the auxiliary track is disposed at a first position where the auxiliary track is adjacent to a floor surface as compared with a position of the travel rail or is disposed at a second position where the auxiliary track is in contact with the travel rail; and a body part provided with the lift part, the body part including wheels to move on the floor surface, and the auxiliary track being configured to be elevated to the second position, and the transfer apparatus being configured to move between the travel rail of a position to which the body part is moved and the auxiliary track, and wherein the lift part includes:

a frame on which the auxiliary track is installed; and a cylinder provided in the body part, the cylinder being configured to adjust a height of the frame.

8. The transfer system of claim 7, wherein the cylinder includes a fork on which the frame is supported, the cylinder being configured to elevate or lower the fork using hydraulic pressure or pneumatic pressure so that a length thereof in the vertical direction is adjusted.

9. The transfer system of claim 7, wherein the MTL apparatus further includes a rotating plate provided at a position that the auxiliary track faces in the travel rail, the rotating plate being in contact with the auxiliary track according to elevating or lowering of the auxiliary track to axially rotate, the rotating plate being configured to connect the travel rail and an upper surface of the auxiliary track to each other.

10. A transfer system comprising:

a travel rail forming a movement path of a transfer apparatus; and an MTL apparatus in contact with or spaced apart from the travel rail, wherein the MTL apparatus includes:

an auxiliary track configured to extend a movement path of the travel rail;

a lift part configured to adjust a length of the lift part in a vertical direction or elevated or lowered to move the auxiliary track so that the auxiliary track is disposed at a first position where the auxiliary track is adjacent to a floor surface as compared with a position of the travel rail or is disposed at a second position where the auxiliary track is in contact with the travel rail; and a body part provided with the lift part, the body part including wheels to freely move on the floor surface, and the auxiliary track being configured to be elevated to the second position, and the transfer apparatus being configured to move between the travel rail of a position to which the body part is moved and the auxiliary track, and wherein the MTL apparatus further includes:

a guide block on the travel rail, the guide block having a through hole formed to penetrate therethrough in the vertical direction and having a diameter decreasing toward an upward direction; and a link installed on the auxiliary track, the link including a pin guided to the through hole to penetrate through the guide block.

11. The transfer system of claim 10, wherein the travel rail includes an open track forming an open section so that the transfer apparatus is moved to outside of the movement path, the MTL apparatus further including a first stopper above the guide block and rotatably installed on the travel rail so as to interfere with the movement path by traversing the travel rail or open the movement path, and the link being configured to push a lower portion of the first stopper in the upward direction in association with the elevation of the auxiliary track so as to rotate the first stopper.

12. The transfer system of claim 11, wherein the travel rail includes a plurality of bay parts in which the transfer apparatus performs tasks and a passage part connecting the bay parts to each other, and the open track is included in one or more of the bay parts.

13. The transfer system of claim 11, wherein the MTL apparatus further includes:

a separation preventing part in the auxiliary track, the separation preventing part being configured to interfere with a path of the transfer apparatus or allowing movement of the transfer apparatus according to a rotation of the preventing part; and a second stopper on a side surface of the separation preventing part in the auxiliary track, the second stopper being configured to limit a rotation angle of the separation preventing part in a first direction, and the separation preventing part being configured to rotate and lie down in a second direction opposite to the first direction or stand so as to interfere with the path of the transfer apparatus, a rotation of the separation preventing part in the first direction in a state in which the separation preventing part stands being limited by the second stopper.

14. A transfer system comprising:

a travel rail forming a movement path of a transfer apparatus; and an MTL apparatus in contact with or spaced apart from the travel rail, wherein the MTL apparatus includes:

an auxiliary track configured to extend a movement path of the travel rail;

a lift part configured to adjust a length of the lift part in a vertical direction or elevated or lowered to move the auxiliary track so that the auxiliary track is disposed at a first position where the auxiliary track is adjacent to a floor surface as compared with a position of the travel rail or is disposed at a second position where the auxiliary track is in contact with the travel rail; and a body part provided with the lift part, the body part including wheels so as to move on the floor surface, and the auxiliary track being configured to be elevated to the second position, and the transfer apparatus being configured to move between the travel rail of a position to which the body part is moved and the auxiliary track; and an overturn preventing part in the body part, the overturn preventing part being configured to rotate in an outward direction on the basis of the body part to expand a support area of the body part, the overturn preventing part being configured to adjust a length of the overturn preventing part in the vertical direction to be in contact with the floor surface or be spaced apart from the floor surface.

* * * * *